United States Patent Office 3,240,751
Patented Mar. 15, 1966

3,240,751
STABILIZATION OF PHOSPHITES AND EPOXY RESINS CONTAINING PHOSPHITES BY ALKALINE EARTH METAL OXIDES
Joseph Anthony Cannon, Affton, and Joseph Raymond Darby, Webster Groves, Mo., assignors to Monsanto Company, a corporation of Delaware
No Drawing. Filed June 3, 1960, Ser. No. 33,627
16 Claims. (Cl. 260—45.75)

This invention relates to a new and useful composition of matter comprising a phosphite ester and a metal oxide. In a particular embodiment this invention relates to new and improved epoxide resin compositions containing a mixture of a phosphite ester and a metal oxide.

Phosphite esters hydrolyze in the presence of moisture and this produces phosphite esters which have undesirable properties for certain applications where such compounds are employed. As for example, when triphenyl phosphite which has been exposed to moisture is incorporated in a liquid epoxy resin, the resulting composition tends to develop a high peak exotherm when cured. High peak exotherms tend to result in cured products which are dark and contain bubbles and fissures that affect the physical properties of the cured product.

Moreover, when an epoxide resin composition containing a phosphite ester is exposed to the air, particularly moist air for extended periods of time, a thick resinified skin develops on the surface which makes it difficult to pour the mixture from its container.

In accordance with this invention, it has been found that when a metal oxide (hereinafter defined) is mixed with a neutral ester of a phosphorous acid (herein referred to for convenience as a phosphite ester), the phosphite ester has improved hydrolytic stability. Additionally, when such a mixture is admixed with an epoxide resin, surprising improvements in the stability of the epoxide resin composition result.

The metal oxides which are useful in the compositions of this invention are the oxides of the alkaline earth metals, such as magnesium oxide, calcium oxide, barium oxide and strontium oxide. Magnesium oxide is preferred. Powdered or light magnesium oxide is especially preferred.

By the term "a neutral ester of a phosphorous acid" is meant esters of a phosphorous acid having three divalent chalkogen (i.e. oxygen, sulfur, selenium or tellurium) atoms attached to the phosphorus atom, at least two of the divalent chalkogen atoms also being attached to the same organic radical or to separate radicals and which may be like or unlike, any remaining chalkogen radical being attached to a hydrogen atom, e.g. phosphites, phosphorothioites, phosphorodithioites, phosphorotrithioites, hydrogen phosphites, di- or polyphosphites, etc. The term "neutral" is used in its ordinary sense since such esters, including the dialkyl and diaryl esters, do not form salts or bases.

Phosphite esters having the following structure

wherein X is a divalent chalkogen atom having an atomic weight of less than 35, i.e. oxygen or sulfur and $R_1$ and $R_2$ are like or unlike organic radicals, e.g. aromatic, aliphatic, alicyclic radicals and $R_3$ is hydrogen or an organic radical, represent a preferred class of phosphite esters which are contemplated within the broad scope of this invention. For example, the aromatic radicals may be aryl radicals such as phenyl, tolyl, ethylphenyl, nonylphenyl, decylphenyl, 2,4-dibutylphenyl, 2-methyl-3-ethylphenyl, cyml, xenyl, naphthyl, and the like or aralkyl radicals such as benzyl, phenylethyl, phenylpropyl, phenylheptyl, and the like; the aliphatic radicals may be alkyl radicals such as methyl, ethyl, isopropyl, butyl, isoamyl, hexyl, heptyl, 2-ethylhexyl, nonyl, isodecyl, dodecyl, and the like, or alkenyl radicals such as allyl, propenyl, butenyl, pentenyl, and the like; or alkynyl radicals such as propynyl, butynyl, pentynyl and the like; the alicyclic radicals may be cycloalkyl radicals such as cyclopentyl, cyclohexyl, cycloheptyl, or cycloalkenyl radicals such as cyclopentenyl, cyclohexenyl, cycloheptenyl, and the like; etc.

The aforementioned radicals may also be substituted by one or more substituents. Typical, but not limitative of such substituents are the halogens, such as chlorine, bromine, iodine and fluorine; alkoxy groups such as methoxy, ethoxy, propoxy, butoxy, ethoxybutoxy, etc.; one or more hydroxy groups, etc.

It is preferred that the divalent X radical in the above formula be an oxygen atom and that the $R_1$, $R_2$ and $R_3$ radicals each be an aryl hydrocarbon radical containing from 6 to 15 carbon atoms. Triphenyl phosphite is particularly preferred.

As exemplary of other classes of phosphite esters included within the scope of the term "a neutral ester of a phosphorous acid" there may be mentioned the cyclic organic phosphites, such as those obtained by the reaction of an arylene dichlorophosphite with a glycol having adjacent hydroxyl groups, these compounds and the preparation thereof are more completely described in U.S. 2,839,563; also the cyclic organic phosphites obtained by the reaction of a diol with a triaryl phosphite, said process being more completely described in U.S. 2,834,798; alkanolamine phosphites as are obtained by the partial transesterification of a tertiary aromatic phosphite, said process being more completely described in U.S. 2,841,607; tetra-aromatic alkylene phosphites obtained by the reaction of 2 mols of an appropriate secondary aromatic monochlorophosphite with a vicinal glycol in the presence of two mols of a tertiary base, e.g. see U.S. 2,841,606; a pentaerythritol phosphite derivative as is described in U.S. 2,847,443; etc.

The phosphite esters contemplated by the term "a neutral ester of a phosphorous acid," are for the most part obtained by the reaction of an appropriate hydroxy or thiol compound with phosphorous trihalide in the presence or absence of a hydrogen halide acceptor. It is preferred that the hydroxy or thiol compound, e.g. the aliphatic alcohol, aromatic alcohol phenol, or the thiol compound e.g. aliphatic thioalcohol (mercaptan), aromatic thioalcohol (mercaptan) etc., have an acid dissociation constant $Ka$ above about $1 \times 10^{-13}$ in that the phosphite ester which has an (R–X) moiety derived from a hydroxy or thiol compound having an acid dissociation constant above this value provides especially desirable results when incorporated in an epoxy composition.

Ethoxyline, epoxy or epoxide resins, as they are variously called, are well known to those skilled in the art. The epoxide resins useful in compositions and methods of this invention are those resinous organic compounds containing at least one epoxy group, i.e.

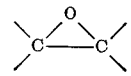

These compounds may be saturated or unsaturated, aliphatic, cycloaliphatic, aromatic, or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups. Such resins are commonly referred to as glycidyl polyethers.

Among the polyhydric phenols which may be used in preparing such glycidyl polyethers are the mononuclear phenols such as resorcinol, catechol, hydroquinone, etc. and the polynuclear phenols, such as bis(4-hydroxyphenol)-2,2-propane, 4,4'-dihydroxybenzophenone, bis-(4-hydroxyphenyl)-1,1-ethane, bis(4-hydroxyphenyl)-1,1-isobutane, bis(4-hydroxyphenyl)-2,2-butane, bis(4-hydroxy-2-methylphenyl) - 2,2 - propane, bis(4-hydroxy-2-tertiary butylphenyl) - 2,2 - propane, bis(4-hydroxy-2,5-dichlorophenyl)-2,2-propane, 4,4'-dihydroxybiphenyl, 4,4'-dihydroxypentachlorobiphenyl, bis(2-hydroxynaphthyl)-methane, 1,5-dihydroxy naphthalene, phloroglucinol, 1,4-dihydroxynaphthalene, 1,4-bis-(4-hydroxyphenyl) cyclohexane, etc. as well as other complex polyhydric phenols such as pyrogallol, phloroglucinol and novalac resins from the condensation of a phenol with an aldehyde in the presence of an acidic condensation catalyst. For the nature and preparation of novalac resins, see the book by T. S. Carswell, "Phenoplasts," 1947, page 29, et seq.

The preferred polynuclear phenol is bis(4-hydroxyphenyl)-2,2-propane, known in the trade as bisphenol-A.

In admixture with the named polynuclear phenols, use also may be made of those polynuclear phenols wherein the phenol nuclei are joined by sulfur bridges, as for example, in 4,4'-dihydroxydiphenyl sulfone.

Less preferably, there can be used 1,2-epoxy containing polyethers of aliphatic polyhydric alcohols, such as the polyglycidyl ethers thereof, as for example, the diglycidyl ethers of ethylene glycol, propylene glycol, trimethylene glycol, triethylene glycol, butylene glycol, diethylene glycol, 4,4'-dihydroxydicyclohexyl, glycerol, dipropylene glycol and the like, as well as ethers containing more than two glycidyl groups such as the glycidyl polyethers, glycerol, mannitol, sorbitol, polyallyl alcohol, polyvinyl alcohol and the like. Such glycidyl polyethers also have a 1,2-epoxy value greater than 1.0.

These epoxide resins, glycidyl polyethers as they are frequently called, may be prepared by reacting predetermined amounts of at least one polyhydric compound and one epihalohydrin in an alkaline medium.

While it is preferred to use epichlorohydrin as the epihalohydrin in the preparation of the epoxide starting materials of the present invention, other epihalohydrins such as epibromohydrin may be used advantageously.

In the preparation of these epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula

wherein $n$ is an integer of the series 0, 1, 2, 3 . . . , and R represents a divalent hydrocarbon radical of a polyhydric compound and preferably a dihydric phenol. While for any single molecule $n$ is an integer, the fact that the obtained polyether is a mixture of compounds causes the determined value for $n$, e.g. from molecular weight measurement, to be an average which is not necessarily a whole number.

The glycidyl polyethers suitable for use in this invention have a 1,2-epoxy equivalency greater than 1.0. By epoxy equivalency, reference is made to the average number of 1,2-epoxy groups

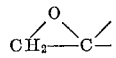

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The glycidyl polyether may, for example, have an equivalency of 1.5, 1.8, 2.5 and the like.

Glycidyl polyethers are disclosed in various places in the art; among the references which may be mentioned are: U.S. Patents 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under various trade names. Data on several types are given in Table I below:

TABLE I

| Trade name and number | Epoxide, equivalent wt. | Viscosity,[1] 25° C. (Gardner-Holt) | M.P., °C., Durran mercury method |
| --- | --- | --- | --- |
| Epon 815 | 175–210 | 5–9 poises | Liquid |
| Epon 828 | 175–210 | 50–150 poises | 8–12 |
| ERL 2774 | 185–200 | 105–195 poises | 8–12 |
| Epon 834 | 225–290 | O–V | 20–28 |
| Epon 1001 | 450–525 | C–G | 64–76 |
| Epon 1004 | 870–1,025 | Q–U | 95–105 |
| Epon 1007 | 1,650–2,050 | Y–Z | 125–132 |

[1] The viscosities of Epon 815, Epon 828, and ERL 2774 are on pure resin, Epon 834 on 70% weight solution in butyl carbitol, and all other types on 40% weight solution in butyl carbitol.

The preferred polyethers are prepared from bis(4-hydroxyphenyl)propane and contain a chain of alternating glyceryl and 2,2-bis(4-phenylene) propane radicals separated by intervening ethereal oxygen atoms and have a 1,2-epoxy equivalency between 1 and 2, an epoxide equivalent weight of about 175 to 600, preferably from about 175 to 370. A particularly suitable material for use in the invention is the normally liquid glycidyl polyether of bisphenol-A having an epoxide equivalent weight of about 175 to 220 and a 1,2-epoxy equivalency of about 1.8 to 1.95.

Another group of epoxide resins that may be used are those which are derived by the reaction of peracetic acid and unsaturated compounds. A typical member of this class is the epoxide resin derived from butadiene and crotonaldehyde which have undergone the Diels-Alder condensation and the Tischenko reaction:

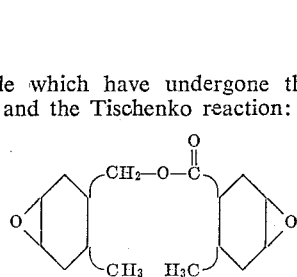

This compound is sold commercially as EP 201.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Patent 2,847,394.

Another group of epoxide resins are those produced by the epoxidation of an ester of a higher fatty acid, e.g. by the reaction of an ester of a higher fatty acid with hydrogen peroxide and acetic acid in the presence of an acid cation exchange resin such as nuclear sulfonic and phenolic methylene sulfonic cation exchange resins. Such epoxide resins and their preparation are more fully described in U.S. Patent 2,919,283.

The hardening of epoxide compositions of this invention may be accomplished by the addition of any of the chemical materials known in the art for curing epoxide resins. Such materials are usually referred to as curing agents but at times are designated as hardeners, activators or catalysts. While some curing agents promote curing by catalytic action; others participate directly in the reaction and are absorbed into the resin chain. Depending upon the particular agents used, the curing may be accomplished at room temperature, with heat produced by exothermic reaction or by the application of external heat. Obviously, some of these agents are more suitable than others for a particular purposes; for example, certain liquid curing agents are suitable for improving the fluidity of the compositions as well as for performing the curing or hardening function.

Numerous examples of curing agents which may be used with the compositions of this invention and which are known to those skilled in the art for curing epoxide resins are for example various amines such as aliphatic and aromatic primary, secondary and tertiary amines, e.g. diethylamine, mono-, di- and tri-butylamines, octylamine, dodecyl amine, cyclohexylamine, benzylamine, benzyl dimethyl amine, piperidine, piperazine, etc.; polyamines, e.g. m-phenylene diamine, p-phenylene diamine, 4,4'-methylenedianiline, m-xylenediamine, 4,4'-diaminodiphenyl sulfone, 4,4'-methylene dianiline-diaminodiphenyl sulfone blend, m-phenylene diamine-diaminodiphenyl sulfone blends, ethylene diamine, N,N-diethylene diamine, diethylene triamine, triethylene tetramine, tetraethylenepentamine, pentaethylene diamine, etc.; oxyamines such as ethanolamine, butanolamine, diethanolamine, triethanolamine, etc.; hydroxy-alkylated polyamines, such as 2-aminoethyl-ethanolamine, N-hydroxyethyl - 1,2 - diamino propane, 1,3 - diaminopropanol, N-hydroxypropyl-m-phenylene diamine, N-(2-hydroxypropyl)-ethylene diamine, N,N'-bis(hydroxyethyl) triethylene triamine, N-(hydroxyethyl) diethylene triamine, etc.; phenolic tertiary amines, such as dimethylaminomethylphenol, tris(dimethylaminomethyl)phenol, etc.; the salts of phenolic tertiary amines, such as the 2-ethylhexanoic acid salt of tris(methylaminomethyl)phenol, etc., aliphatic amine-adducts, such as diethylene triamine, 4,4'-isopropylene diphenol adduct, diethylene triamine/acrylonitrile adduct, acrylonitrile/tetraethylene pentamine adduct, etc.; cyanamide and its polymerization products, e.g. dicyandiamide; alcoholates of polyvalent metals, such as aluminum butylate, ferric butylate, and the like; amide type curing agents, including primary carboxylic acid amides and polyfunctional carboxylic acid amides, e.g. acetamide, adipamide, benzamide, diacetamide of hexamethylene diamine, monoamides of the type described in U.S. 2,760,944, sulfonamides of the type described in U.S. 2,712,001, etc.; polyamides, e.g. the polyamide resins sold by General Mills under the Versamid trademark which may be used in such quantities that they function as flexibilizing modifiers, etc.; organic and inorganic acids and anhydrides, e.g. citric acid, acetic acid, aconitic acid, oxalic acid, succinic acid, succinic anhydride, dodecylsuccinic anhydride, lactic acid, maleic acid, maleic anhydride, fumaric acid, phthalic acid, phthalic anhydride, pyromellitic dianhydride, hexachloroendomethylene tetrahydrophthalic anhydride, hexahydrophthalicanhydride, methyl endomethylene tetrahydrophthalic anhydride, 1,2,4-butanetricarboxylic acid, isophthalic acid, terephthalic acid, acetoacetic acid, malonic acid, sulfonic acids, such as benzenesulfonic acid; phosphinic acids such as dibenzenephosphinic acid, and the like; the boron trifluoride complexes (U.S.2,839,495) such as the p-cresol and urea complex, diethyleneaniline-boron trifluoride complex, monoethylamine-boron trifluoride complex, etc.; and metal containing organic and inorganic compounds as zinc fluoborate, potassium persulphate, nickel fluoborate, copper fluoborate, selenium fluoborate, magnesium fluoborate, tin fluoborate, potassium perchlorate, cupric sulfate, cupric phosphate, cupric phosphite, cobaltous fluoborate, cobaltous fluosiliocate, chromic sulfate, chromic sulfite, lead arsenite, lead borate, lead molybdate, magnesium sulfate, cadmium arsenate, cadmium silicate, silver chlorate, silver fluosilicate, strontium chlorate, aluminum phosphate, aluminum fluoborate, ferrous silicate, manganese hypophosphite, nickel phosphate, and nickel chlorate.

The polyamine curing agents and the polycarboxylic acid anhydride curing agents are especially useful in the epoxide compositions of this invention.

A good many of the above-listed curing agents are liquids and, as mentioned above, can serve the dual role of improving the fluidity and effecting cure. Some of these which are particularly useful in such a dual role are liquid polyamines, e.g. diethylene triamine. It is often advantageous to use mixtures of different curing agents, sometimes a liquid and a solid agent or two liquid or two solid curing agents.

Effective concentrations of curing agents in the epoxy resin compositions of this invention vary in wide ranges depending on the particular epoxide and curing agent selected and the desired rate of cure. For the catalytic type curing agents the amount employed will usually vary from about 1 to about 20 parts per 100 parts by weight of the epoxide and more preferably from 1 part to 5 parts per 100 parts of the epoxide. It is generally suitable to use up to about 50 parts per 100 parts epoxide of a polycarboxylic acid or anhydride, while in the case of an amine or amide type, from about 5 to about 20 parts per 100 parts by weight of epoxide are generally used. With the cross-linking amines, the customary method is to allow one epoxy group for each active hydrogen of the amine curing agent. Since the phosphorus containing modifier of this invention acts as a partial replacement for the amine curing agent, it is preferred to use less than a stoichiometric amount. Note for example (see Example V) that with diethylene triamine it is only necessary to use 8 phr. (parts per hundred parts of epoxide resin) of the amine when 25 phr. of triphenyl phosphite is present, as contrasted with 12 phr. when no phosphite is present. Hence, one-third of a gram mole of phosphite replaces one gram mole of active hydrogen.

Various other ingredients may be mixed with the compositions of the present invention, including pigments, colors, fillers, resin stabilizers, flexibilizing modifiers and the like.

To illustrate the manner in which the invention is carried out, the following examples are given. It is to be understood, however, that the examples are for the purpose of illustration and the invention is not to be regarded as limited to any of the specific conditions recited therein. Unless otherwise specified, parts disclosed in the following examples are parts by weight.

*Example I*

Ten parts of a commercial grade of triphenyl phosphite is poured in an aluminum dish (2″ diam. x ¼″ deep). This material tests neutral with pH paper (i.e. Fisher's Scientific Alkacid Test Ribbon). The sample is laced in a constant-temperature room (CTR) wherein the temperature is controlled at 23.5° C. and the relative humidity is 50%. When the sample is tested with pH paper a few minutes later, an acid condition is indicated.

In contrast to this when a sample (ten parts) of the same triphenyl phosphite, in which there are dispersed 0.05 parts (0.5% by weight, based on the phosphite ester) of powdered or light magnesium oxide (0.1 to 1 micron) is exposed to the same conditions, the mixture remains neutral when tested with pH paper for a period of three days.

*Example II*

Compositions comprising, respectively:

|  | A | B | C | D | E |
|---|---|---|---|---|---|
| Epoxide resin (glycidyl polyether of bis-(2-hydroxyphenyl)2,2-propane, epoxide equivalent weight 175–210) | 100 | 100 | 100 | 100 | 100 |
| Diethylene triamine | 12 | 8 | 8 | 8 | 8 |
| Triphenyl phosphite (pH, neutral) |  | 25 | 25 |  |  |
| Triphenyl phosphite [1] (pH, acid) |  |  |  | 25 | 25 |
| Magnesium oxide (powdered, U.S.P. grade) |  |  | 0.125 |  | 0.125 |

[1] This is obtained by pouring the phosphite ester into a glass dish (8″x8″x½″) and placing the open dish in a constant temperature room (23.5° C.+50 R.H.) for a period of 2 hours.

are prepared by simply mixing the indicated amounts of the respective ingredients. The resulting mixture is stirred thoroughly, poured into a test tube to a depth of 3 inches, and the test tube is placed in an oil bath (84° C. ambient temperature). A thermocouple (No. 18 hypo needle with wires soldered inside) is inserted half way down in the fluid. The thermocouple is attached to a Leeds and Northrup "Speedomax" automatic temperature recorder (chart speed ½″ per minute). The maximum temperature recorded is the peak exotherm. The peak exotherm data for above compositions is given in Table A below.

TABLE A

Formulation: Peak exotherm, ° C.
A _____ 290
B _____ 277
C _____ 281
D _____ 320
E _____ 219

*Example III*

In order to further demonstrate the stabilizing properties of magnesium oxide, Formulations B and C of Example II and a sample (Formulation F) containing 100 parts by weight of epoxide resin (Example II), 8 parts diethylene triamine, 25 parts of triphenyl phosphite and 0.0625 part (0.25% by weight based on the phosphite) of light magnesium oxide are each poured in an aluminum dish (2″ diam. x ¼″ deep) and placed in a constant temperature room (23.5° C. +50% R.H.). Each sample is tested daily for skin formation. Formulation B developed a skin after a period of ten days. Formulation F does not skin until after 2 months. After a period of 10 weeks Formulation C is still completely liquid, i.e. there is no evidence of skin formation.

Results similar to those obtained with Formulations B and F are realized upon substituting calcium oxide, barium oxide, and strontium oxide, respectively, in substantially the same amount for the magnesium oxide in these formulations.

Similar results are obtained when the triphenyl phosphite of Formulations B, C and F is replaced by an equal amount of the following phosphite esters; Tricresyl phosphite, tri(p-chlorophenyl) phosphite, decyl diphenyl phosphite, 2-ethylhexyl diphenyl phosphite, tricresyl -phosphorotrithioite, tetraphenyl ethylene diphosphite, tri(3,5-dimethylphenyl) phosphite, 1,3-diphenoxy-2-propyl diphenyl phosphite, 2,2,2-trichloroethyl diphenyl phospite and tri(p-tert. butylpenyl) phosphite.

*Example IV*

Compositions comprising respectively:

|  | G | H | I | J | K | L |
|---|---|---|---|---|---|---|
| Epoxide resin (Example II) | 100 | 100 | 100 | 100 | 100 | 100 |
| Triphenyl phosphite | 25 | 25 | 25 | 25 | 25 | 25 |
| Silica (humidified for 3 hrs. at 50° C.) | 20 | 20 |  |  |  |  |
| Silica (15% H₂O) |  |  | 15 | 15 | 15 | 15 |
| Magnesium oxide |  | 0.125 |  | 0.075 | 0.15 | 0.75 | were prepared by mixing the respective ingredients in the amounts set forth. In Formulations G and H the magnesium oxide is added to the phosphite and this mixture is then mixed with the epoxide resin and the silica. In the other formulations the magnesium oxide is mixed first with the silica and this mixture is in turn stirred into a mixture of the epoxide resin and the phosphite ester. Each formulation is placed in a closed four ounce bottle in a constant temperature room (23.5° C.). Each sample is then tested daily for gel formation. The gel data on the above formulations is given in Table B below:

TABLE B

Formulation: Time to gel
G _____ 4 days.
H _____ 7 weeks.
I _____ 3 days.
J _____ 3 weeks.
K _____ 4 weeks.
L _____ No evidence of gelation after 9 weeks.

The foregoing results effectively demonstrate the stabilizing ability of magnesium oxide in a fluid epoxide resin composition containing a phosphite ester.

*Example V*

Compositions comprising, respectively:

|  | M | N | O |
|---|---|---|---|
| Epoxide resin (Example II) | 200 | 200 | 200 |
| Diethylene triamine | 24 | 16 | 16 |
| Triphenyl phosphite |  | 50 |  |
| Triphenyl phosphite containing 0.5% by weight of light magnesium oxide |  |  | 50 | are prepared by mixing the ingredients in the amounts set forth above. Each sample is then poured into an aluminum mold (10″ x 10″ x ⅛″) coated with a standard mold release agent and cured at room temperature (23.5° C.) for a period of 24 hours (1st cure). Each sample is removed from its mold and a piece is cut which is then tested for hardness (using a standard instrument), heat distortion temperature (ASTM—D–648–45T), tensile strength (ASTM—D–638–58T) and flexural strength (ASTM—D–790–58T).

The samples are cured at room temperature (23.5° C.) for a period of 2 weeks (2nd cure) and tested again for hardness and heat distortion temperature. Finally, the samples are post cured at 100° C. for a period of 8 hours (post cure) and tested for hardness and tensile strength. The results obtained are set forth in Table C below:

TABLE C

| Composition | Cure | Hardness, Rockwell "M" | Heat distortion, temp., °C. | Tensile strength, p.s.i. | Flexural strength, p.s.i. |
|---|---|---|---|---|---|
| M | 1st | 70 | 54 | 6,950 | 18,000 |
| M | 2nd | 80 | 62.5 | | |
| M | Post | 105 | | 12,300 | |
| N | 1st | 56 | 40 | 8,230 | 11,600 |
| N | 2nd | 90 | 50 | | |
| N | Post | 103 | | 12,000 | |
| O | 1st | 61 | 40 | 7,700 | 12,000 |
| O | 2nd | 90 | 50 | | |
| O | Post | 102 | | 11,700 | |

The above data effectively demonstrate that the physical properties of a phosphite modified epoxide resin composition are not adversely affected by the incorporation of a metal oxide of the invention.

*Example VI*

In this example 100 parts of an epoxide resin (same as Example II) is mixed with 25 parts of triphenyl phosphite, 1 part of 2,4,6-tri(dimethylaminomethyl) phenol and 50 parts of phthalic anhydride (Composition P) The second composition (Composition Q) contains 0.25 parts of light magnesium oxide in addition to the other components. Each mixture is stirred thoroughly and then cured for eight hours at 150° C. The physical properties of the resulting cured products are set forth in Table D below:

TABLE D

| Composition | Rockwell hardness "M" | HDT, °C. | Flexural strength, p.s.i. | Flexural modulus, p.s.i.×10⁻⁶ |
|---|---|---|---|---|
| P | 96 | 51 | 14,000 | 0.37 |
| Q | 96 | 52 | 13,100 | 0.40 |

*Example VII*

A hardenable, filled composition is prepared by mixing 400 parts of an epoxide resin having an epoxide equivalent weight of 225–290 and 200 parts of triphenyl phosphite containing 1% by weight of light magnesium oxide. To this is added 200 parts of calcium carbonate and 32 p-tetraethylene pentamine. The mixture is passed through a three-roll paint mill until a homogeneous product of smooth consistency is obtained. The resulting product cures completely to a solid homogeneous state without undergoing any substantial volume shrinkage upon heating at a temperature of 150° C. for 2 hours.

Further examples of formulations combined in a way similar to that in the preceding example include Examples VIII and IX below:

*Example VIII*

| | Parts |
|---|---|
| Epoxide resin (glycidyl polyether of bis(4-hydroxyphenyl)2,2-propane, epoxide equivalent weight 175–210) | 600 |
| Kaolin | 50 |
| Calcium carbonate | 100 |
| Maleic anhydride | 100 |
| Diethylamine propylamine | 50 |
| Calcium oxide | 12 |
| Triecresyl phosphite | 350 |
| Triallyl phosphite | 50 |

*Example IX*

| | Parts |
|---|---|
| Epoxide resin (glycidyl polyether of bis(4-hydroxyphenyl)2,2-propane, epoxide equivalent weight 450–525) | 500 |
| Methylethyl ketone | 100 |
| Titanium dioxide | 30 |
| m-Phenylene diamine | 50 |
| Tetra (diphenyl phosphite) pentaerythritol | 250 |
| Magnesium oxide | 15 |

*Example X*

Epoxide compositions, containing epoxide resins prepared by the peracid method, are prepared by mixing the indicated amounts of the respective ingredients listed in Table E below. The resulting mixtures are each poured into an aluminum foil mold (⅛") and then cured. Each formulation is subjected to an initial cure of 120° C. for 3 hours and 40 minutes and a post cure of 160° C. for 3 hours.

TABLE E

| | 1 | 2 | 3 | 4 |
|---|---|---|---|---|
| EP 201 (epoxide equiv. wt., —140) | 100 | 100 | | |
| Limonene dioxide (epoxide equiv. wt., 84) | | | 100 | 100 |
| Triphenyl phosphite | 25 | 25 | 25 | 25 |
| Magnesium oxide | | 0.125 | | 0.125 |
| Diethylene triamine | 15 | 15 | 32 | 32 |

Each yield hard, clear resinous products before the end of the full curing cycle.

As is evident from the results obtained above, when a physical mixture of a phosphite ester and a metal oxide is incorporated in an epoxide composition, surprising improvements in the stability of the epoxide composition result. Thus, an epoxide composition containing a phosphite ester diluent is unstable in that it tends to skin or gel within a short period of time. The exact time varies, of course, since this depends upon the humidity of the atmosphere, and the concentration of water in the composition, as for example where the filler employed contains water.

The amount of metal oxide used can be varied within wide ranges depending upon the degree of stability that is sought and the use which is to be made of the phosphite ester-metal oxide mixture. Generally, amounts in the range of from about 0.05% to about 10% by weight (based on the phosphite ester) of metal oxide produce desirable results. More preferably, from about 0.1% to about 1% by weight of the metal oxide is employed. Optimum results are obtained when 0.5% to 1% by weight of light magnesium oxide is used with the phosphite ester.

The particle size of the metal oxide can be varied but is preferably finely ground and is of the usual compounding pigment grade so that a good dispersion is obtained and effective stabilization is obtained thereby. Metal oxides ranging in particle size from about 0.05 micron to about 10 microns or more are satisfactory in the compositions of this invention. Metal oxides having an average particle size within the range of 0.1 to about 5 microns are preferred for the compositions of this invention. Light magnesium oxide, i.e. having a particle size within the range of 0.1 to 1 micron is especially preferred.

The phosphite ester-metal oxide mixture of this invention may be prepared, as indicated by the foregoing examples, by simply mixing the several components. When an epoxide resin composition is to be prepared containing these two components, the previously prepared mixture may be added to the epoxide resin or the respective ingredients may be added separately to the epoxide resin. When a curing agent is to be incorporated, it may be desirable to add this component just prior to use, particularly if the curing agent renders the composition curable at or near room temperature. In the case of certain phosphite esters, it may be desirable to warm the phosphite ester-epoxide resin mixture to effect complete solution thereof. Thereafter, however, the mixture may be cooled to room temperature and still remain homogeneous.

Aromatic phosphites generally admix at room temperature with epoxide resins to form homogeneous mixtures, i.e. the two components are completely miscible with each other without the application of heat. In the case of certain of the phosphite esters, e.g. alkyl phosphites in which the alkyl groups contain more than four carbon atoms, the presence of other components, e.g. a liquid curing agent, may be necessary to effect complete solution with or without the application of heat.

It will be appreciated by those skilled in the art that the choice and amount of the various components of the compositions of the invention will be subject to adjustment and correlation, and thusly, will depend on the use for which the composition is intended and the result desired, e.g. the type and amount of epoxide resin, the phosphite ester, curing agent (if any), etc. These factors in turn are subject to adjustment and correlation with the procedure for preparing the complete compositions, e.g. order of mixing, etc.

Generally, amounts of phosphite ester in the range of 5 to 150 parts per 100 parts by weight of epoxide resin may be used, however, amounts above or below may be used where desired, e.g. from about 2 to about 200. Amounts in the range from about 5 to about 40 parts of phosphite ester give particularly desirable results in most applications.

In some cases it may be desirable to include conventional non-volatile solvents or liquid reactive solvents, such as those previously mentioned depending on the properties desired in the final product. Thus, such materials may serve to impart homogeneity to the mixture of epoxide resin and the phosphite ester when these two components are not completely miscible with each other and homogeneity is desired.

For certain applications e.g. surface coating, the mixture can be dissolved in solvents, such as toluene, acetone, methylethyl ketone, dioxane, ethylene dichloride, butyl acetate, propylene oxide, etc.

The new epoxide compositions, made with phosphite esters in suitable proportions, form valuable protective layers and films when used either as clear varnishes or as pigmented varnishes, enabling infusible films to be obtained, which possess remarkable chemical resistance and other desirable properties, including high adherence to glass, plastics, ceramics, metal and other hard-to-coat surfaces. Thus, they are useful in the lamination of wood to form plywood, in metal lamination, and particularly so, in glass lamination where the clarity of the adhesive is critical.

These compositions are also useful in impregnating wood and fabrics and in making self-sustaining films and filaments.

The following compounds are given as further examples of phosphite esters which can be employed in the compositions of this invention, and it will be understood that such compounds can be used in place of the various compounds specifically shown in the foregoing detailed examples:

1,3-diphenoxy-2-propyl diphenyl phosphite
2,2,2-trichloroethyl diphenyl phosphite
Phenyl bis(2,2,2-trichloroethyl)phosphite
Tri(butenylphenyl)phosphite
S,S-dicresyl-o-phenyl phosphorodithioite
Tribenzyl phosphorodithioite
O(p-xylyl)-S,S-diphenyl phosphorothioite
Furfuryl diphenyl phosphite
Tripentenyl phosphite
Tri(methoxyphenyl)phosphite
Tri(p-chlorophenyl)phosphite
Ethylene-2-methoxyphenyl phosphite
Tetra(dicresyl phosphite)pentaerythritol
Thenyl bis(3,4-dichlorophenyl)phosphite
O-decyl-S,S-dicresyl phosphorodithioite
Tetra(2-methoxyphenyl)propylene diphosphite
Tri(butoxyethyl)phosphite
Bis($\beta$-chloroethyl)phenyl phosphite
Ethylene phenyl phosphite (2-phenoxy-1,3,2-dioxaphospholane)
4-chloromethyl-2(2'-chlorodecyloxy)-1,3,2-dioxaphospholane
2-phenoxy-4,4,6-trimethyl-1,3,2-dioxaphopsphorinane
Tris($\beta$-naphthyl)phosphite
2-$\beta$-naphthoxyphenyl-diphenyl phosphite
Tris(nonylphenyl) phosphite
Tris(isodecylphenyl)phosphite
Tris(phenylethyl)phosphite While this invention has been described with respect to certain embodiments, it is not so limited and it is to be understood that variations and modifications thereof may be made without departing from the spirit or scope of this invention.

What is claimed is:

1. A composition comprising a neutral ester of a phosphorous acid and a stabilizing amount of an alkaline earth metal oxide.

2. A composition comprising a phosphite ester of the structure:

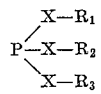

wherein $R_1$ and $R_2$ are organic radicals and $R_3$ is selected from the group consisting of hydrogen and an organic radical and X is a divalent chalkogen atom having an atomic weight of less than 35 and a stabilizing amount of an alkaline earth metal oxide.

3. A composition of claim 2 wherein the phosphite ester is tetra(diphenyl phosphite)pentaerythritol.

4. A composition comprising a phosphite ester of the structure:

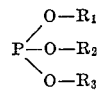

wherein $R_1$, $R_2$ and $R_3$ are aryl radicals having from six to fifteen carbon atoms and from 0.05% to 10% by weight, based on the phosphite ester, of an alkaline earth metal oxide having a particle size within the range of from about 0.05 to 10 microns.

5. A composition comprising a phosphite ester of the structure:

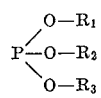

wherein $R_1$, $R_2$, and $R_3$ are aryl hydrocarbon radicals having from six to fifteen carbon atoms and from 0.5% to 1% by weight, based on the phosphite ester, of magnesium oxide, having a particle size within the range of from about 0.1 to about 5 microns.

6. A composition of claim 5 wherein the phosphite ester is triphenyl phosphite.

7. A composition of claim 6 wherein the particle size of the magnesium oxide is within the range of from 0.1 to 1 micron.

8. An improved epoxide composition suitable for use in forming cured resinous products comprising an epoxide resin, at least about 2 parts per 100 parts of resin of a neutral ester of a phosphorous acid and a stabilizing amount of an alkaline earth metal oxide.

9. An improved epoxide composition suitable for use in forming cured resinous products comprising an epoxide resin, from about 5 to about 150 parts by weight per 100 parts by weight of resin of a phosphite ester of the structure:

wherein $R_1$, and $R_2$ are organic radicals and $R_3$ is selected from the group consisting of hydrogen and an organic radical and X is a divalent chalkogen atom having an atomic weight of less than 35 and a stabilizing amount of an alkaline earth metal oxide.

10. A composition of claim 9 wherein the phosphite ester is tetra(diphenyl phosphite)pentaerythritol.

11. An improved epoxide composition suitable for use in forming cured resinous products comprising a glycidyl polyether of a dihydric phenol, from about 5 to about 40 parts by weight per 100 parts by weight of glycidyl polyether of a phosphite ester of the structure:

wherein $R_1$, $R_2$ and $R_3$ are aryl radicals having from six to fifteen carbon atoms and from 0.05% to 10% by weight, based on the phosphite ester, of an alkaline earth metal oxide having a particle size of from about 0.05 to about 10 microns.

12. An improved epoxide composition suitable for use in forming cured resinous products comprising a glycidyl polyether of bis(4-hydroxyphenyl)-2,2-propane, having an epoxide equivalent weight of from about 175 to about 370, an aliphatic polyamine curing agent, from about 5 to about 40 parts by weight per 100 parts by weight of glycidyl polyether of a phosphite ester of the structure:

wherein $R_1$, $R_2$ and $R_3$ are aryl hydrocarbon radicals having from six to fifteen carbon atoms and from 0.1% to 1% by weight, based on the phosphite ester, of magnesium oxide, having a particle size within the range of from about 0.1 to about 5 microns.

13. A composition of claim 12 wherein the particle size of the magnesium oxide is within the range of 0.1 to 1 micron.

14. A composition of claim 13 wherein the glycidyl polyether has an epoxide equivalent weight of from about 175 to about 220.

15. A composition of claim 14 wherein the phosphite ester is triphenyl phosphite.

16. A composition of claim 15 wherein the aliphatic polyamine curing agent is diethylene triamine.

References Cited by the Examiner

UNITED STATES PATENTS

| | | | |
|---|---|---|---|
| 2,874,198 | 2/1959 | Barnhart | 260—652.5 |
| 2,894,923 | 7/1959 | Graham | 260—47 |
| 2,897,176 | 7/1959 | Rocky et al. | 260—45.7 |

OTHER REFERENCES

Grant: "Hackh's Chemical Dictionary," 3rd ed., McGraw-Hill, 1944, page 310 relied on.

LEON J. BERCOVITZ, *Primary Examiner.*

PHILLIP E. MANGAN, LOUISE P. QUAST, *Examiners.*